UNITED STATES PATENT OFFICE.

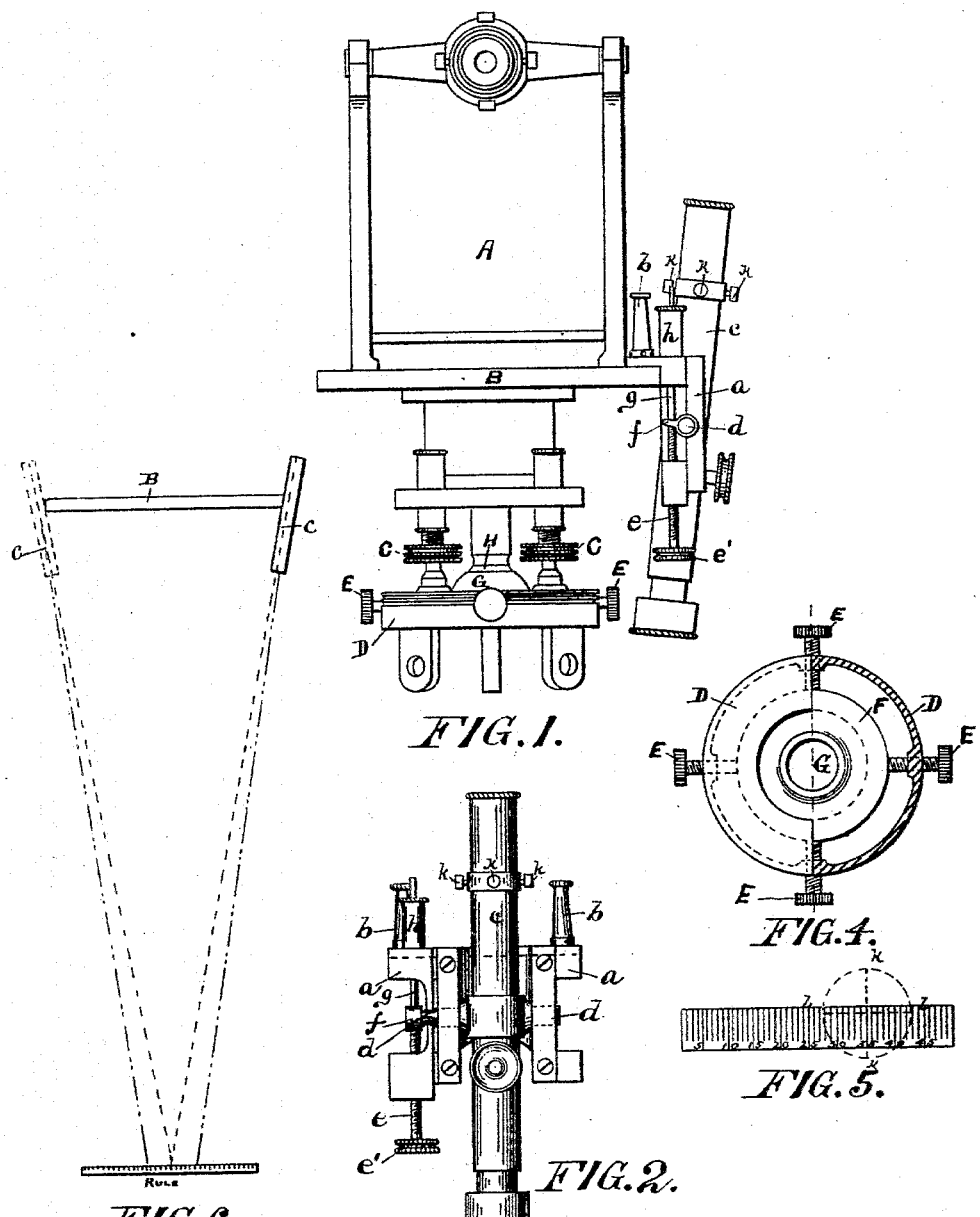

CHARLES H. BRIGHTLY, HERBERT M. FULLER, AND EDGAR A. SINGER, JR., OF PHILADELPHIA, PENNSYLVANIA.

DEVICE FOR CENTERING TRANSIT-INSTRUMENTS OVER PHYSICAL POINTS.

SPECIFICATION forming part of Letters Patent No. 515,815, dated March 6, 1894.

Application filed January 23, 1893. Serial No. 459,386. (No model.)

*To all whom it may concern:*

Be it known that we, CHARLES H. BRIGHTLY, HERBERT M. FULLER, and EDGAR A. SINGER, Jr., citizens of the United States, and residents of the city and county of Philadelphia and State of Pennsylvania, have invented certain new and useful Improvements in Methods of and Devices for Centering Transit-Instruments over Physical Points, of which the following is a specification.

Our invention relates to improvements in devices for centering engineers' transits or other instruments that have to be set up accurately over a given physical point, and the object of our invention is to furnish a device by means of which the instrument may be centered with absolute accuracy at any time.

Our invention and device for centering surveying instruments is adapted for use either alone or in connection with the usual plumb-bob.

Our centering device consists of a small telescope attached tangentially to the edge of the upper part—or revoluble plate of the instrument and moving rotarily with this upper part or plate, and being capable of an independent movement upon trunnions radially to this upper part or plate. This small telescope is furnished with the usual cross wires and is also furnished with a tangent screw and attachments by means of which it may be rotated on its bearings in order to bring the point into its line of sight. The instrument is centered by rotating its upper plate, and by taking observations of the point through the small telescope in two or more positions as hereinafter described.

In the accompanying drawings forming part of this specification and in which similar letters of reference indicate similar parts throughout the several views, Figure 1, is a skeleton end elevation of the head of an engineer's transit instrument having our centering instrument attached; Fig. 2, a detached front elevation of our centering attachment; Fig. 3, a central sectional elevation of the spring actuated plunger and its case which acts against the end of the tangent screw on our attachment; Fig. 4, a plan, partly in section, of the lower parallel plate of the instrument and the ball socket in which the ball attached to the upper part of the instrument works; Fig. 5, a plan of rule used in connection with our centering attachment for rapidly centering the instrument, and Fig. 6, a diagrammatic view showing the method of using our attachment.

A represents the head of a transit instrument, B the upper or revoluble plate of the same, C, the leveling screws.

Our attachment consists of a suitable frame $a$, which is secured by means of screws, $b$, to the upper plate B of the instrument, or this frame may be attached in any suitable manner to any convenient part of the upper or revoluble part of the instrument.

$c$, is a small telescope furnished with trunnions $d$ which are held by and free to turn in bearings in the frame $a$.

$e$ is a tangent screw carried by frame $a$; one end of this screw is furnished with a milled head $e'$ and the other end engages one side of the projecting arm $f$ from one of the trunnions $d$.

$g$ is a plunger (which is carried by frame $a$) the lower end of which engages the arm $f$ upon the side opposite from that of the screw $e$. The upper part of this plunger passes through a case $h$ which is suitably secured to the frame $a$. $i$ Fig. 3, is a collar or shoulder on this plunger and $j$ a spring, one end of which bears against this shoulder and the other against the top of the case $h$; this spring causes the plunger $g$ to always bear against the upper part of arm $f$ on the trunnions and to keep this arm firmly against the end of the screw $e$. By means of screw $e$, plunger $g$ and arm $f$ the telescope $c$ may be rotated in its bearings so as to bring the point over which the instrument is to be set into the line of sight of this telescope. $k$ are the screws which support the cross wires of this telescope, the arrangement of these cross wires being precisely similar to that of the arrangement of the wires of the ordinary transit or level cross wires. One cross wire is preferably placed so as to be in a plane which will always pass through the vertical axis of the instrument; the other or horizontal wire is placed directly at right angles to the first one.

In using our attachment the instrument may be approximately centered by means of the usual plumb-bob, or if this be not used, the instrument is set up roughly over the point and leveled, the telescope c is now inclined to bear upon the point so that the cross wires cut it, the top plate of the instrument is now revolved, say one hundred and twenty degrees, and another observation upon the point is made through the telescope c. If the cross wires do not cut the center of the point, the top plate B is moved so as to correct the error, and when it is found that the cross wires of the telescope c will cut the center of the point at three positions about one hundred and twenty degrees apart, the instrument is then accurately centered over the point.

While it is possible to center the instrument by the method above described it is apt to take more time than can always be spared on account of the numerous observations that are likely to be necessary.

In order to facilitate and hasten the operation of centering without the aid of the plumb-bob we make use of a rule, Fig. 5, which may be divided by lines as shown, into any number of equal parts. This rule is placed upon the ground or secured in any suitable manner to the stake or other object carrying the point over which the instrument is to be centered. The rule having been placed upon the ground, say, alongside the point and the instrument having been set up roughly over the point and leveled, an observation is made upon the rule. The instrument having been first moved so that the horizontal cross wire k of the telescope c will correspond with, or will cover, the graduations on the scale as shown in Fig. 5—(in which the cross wires of the instrument are indicated by dotted lines k—l). We will say that the horizontal cross wire K of the telescope corresponds with the line marked 35 on the rule. The upper part of the instrument is now revolved one hundred and eighty degrees and another observation upon the rule is taken, say that the horizontal cross wire now corresponds with the line 15 on the rule. The mean between the lines 15 and 35, or the line 25, will therefore be a line which passes through the vertical axis of the instrument, and the tangent screw e is turned until cross wire k of the telescope c corresponds with line 25. A point seen at the intersection of cross wires k—l will now be directly in the vertical axis of the instrument. By this method the telescope c may rapidly and accurately be directed so that its cross wires will cut a point upon the ground or any other place beneath the instrument, which will be upon a line corresponding with the vertical axis of the instrument. The cross wires may be made to cut the given physical point by shifting the upper part of the instrument upon the lower parallel plate D.

In order that the upper part of the instrument may be shifted with ease upon the lower parallel plate, and without loosening the leveling screws C, we place in the side of the lower parallel plate and in threaded holes in these sides screws E, which are furnished with milled heads and the ends of which engage the edges of the shifting plate F—Fig. 5, which carries the socket G, in which is placed the ball H which is attached to the upper part of the instrument. The screws E are preferably four in number and are placed diametrically opposite one another. It will be seen that by loosening one set of screws and by setting up upon the opposite one the shifting plate F and the whole upper part of the instrument may be moved in any direction desired, and by this means the cross wires of the telescope c may rapidly and accurately be brought to bear upon the physical point.

It will be noticed that the above means for moving the shifting plate and instrument would often be useful where only the ordinary plumb-bob arrangement was in use.

Having thus described our invention, we claim—

1. The herein described device for centering a surveyor's instrument over a physical point, and in combination with said instrument, a frame secured to the upper or rotatable plate of said instrument, a telescope furnished with cross wires and mounted in bearings carried by said frame and placed tangentially to said rotatable plate, mechanism by means of which said telescope may be rocked in its bearings, and a graduated scale which may be placed alongside said physical point.

2. As a device for centering a transit instrument over a physical point and in combination with said transit, a frame secured to the periphery of the upper or rotatable plate of the instrument, an auxiliary telescope furnished with cross wires and mounted in bearings carried in said frame, and mechanism by means of which said telescope may be rocked in its bearings in order to bring the point into its line of sight.

3. The combination with a transit instrument of a frame secured to and carried by the upper or rotatable plate of the instrument, a small telescope furnished with cross wires and carried in bearings in said frame which are placed tangentially to said upper or rotatable plate, and a tangent screw for rocking said telescope in its bearings, all substantially as and for the purposes set forth.

CHAS. H. BRIGHTLY.
HERBERT M. FULLER.
EDGAR A. SINGER, JR.

Witnesses:
CHAS. SAXE, Jr.,
DAVID WEBER.